US006836244B2

(12) United States Patent
Kitakado (10) Patent No.: US 6,836,244 B2
(45) Date of Patent: Dec. 28, 2004

(54) RADIO RECEPTION APPARATUS CAPABLE OF SELECTING FROM ADAPTIVE ARRAY RECEPTION MODE AND SINGLE ROUTE RECEPTION MODE, AND METHOD AND PROGRAM FOR CONTROLLING ADAPTIVE ARRAY PROCESSING (75) Inventor: Jun Kitakado, Moriguchi (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 10/787,167

(22) Filed: Feb. 27, 2004

(65) Prior Publication Data
US 2004/0189519 A1 Sep. 30, 2004

(30) Foreign Application Priority Data

Mar. 26, 2003 (JP) ........................................ 2003-084620

(51) Int. Cl.[7] ................................................ H01Q 3/00
(52) U.S. Cl. ........................................ 342/377; 342/372
(58) Field of Search ................................ 342/368, 372, 342/374, 377; 455/132, 133, 136

(56) References Cited

U.S. PATENT DOCUMENTS

2004/0014443 A1 * 1/2004 Nakao et al. ............... 455/130

FOREIGN PATENT DOCUMENTS

EP 1353453 A1 * 10/2003 ............ H04B/7/10

OTHER PUBLICATIONS

K.G. Shuppan, "Adaptive Signal Processing by Array Antenna"; Partial English Tanslation of Chapter 3: MMSE Adaptive Array by N. Kikuma, (1998); pp. 35–49.

* cited by examiner

*Primary Examiner*—Dao Phan
(74) *Attorney, Agent, or Firm*—Foley & Lardner LLP (57) ABSTRACT

A main control unit in a radio reception apparatus selects from an adaptive array reception mode and a single route reception mode, in accordance with a prescribed condition. When the adaptive array reception mode is selected, the main control unit performs first control to operate a plurality of radio reception units and an adaptive array operational processing unit. When the single route reception mode is selected, the main control unit performs second control, so that one radio reception unit is selected as a first radio reception unit to operate and an operation of a radio reception unit other than the first radio reception unit and the adaptive array operational processing unit is stopped.

20 Claims, 9 Drawing Sheets

RADIO RECEPTION APPARATUS CAPABLE OF SELECTING FROM ADAPTIVE ARRAY RECEPTION MODE AND SINGLE ROUTE RECEPTION MODE, AND METHOD AND PROGRAM FOR CONTROLLING ADAPTIVE ARRAY PROCESSING

BACKGROUND OF THE INVENTION

1. Field of the Invention

The present invention relates to a radio reception apparatus, and a method and a program for controlling adaptive array processing in the radio reception apparatus. More particularly, the present invention relates to a radio reception apparatus attaining a function to subject signals from a plurality of antennas to adaptive array processing, and a method and a program for controlling adaptive array processing in the radio reception apparatus.

2. Description of the Background Art

Recently, in a rapidly-developing mobile communication system (for example, Personal Handyphone System: hereinafter, referred to as "PHS"), a method of extracting a desired reception signal with adaptive array processing in a radio reception apparatus on a base station side or on a mobile terminal side during communication between the base station and the mobile terminal has been proposed.

In the adaptive array processing, based on a reception signal from a transmission station, a weight vector consisting of reception coefficients (weight) for each antenna in a reception station is calculated for adaptive control, whereby a signal from a desired transmission station is accurately extracted.

In a radio reception system in the reception station, a weight vector calculator calculating such a weight for each symbol in the reception signal is provided. The weight calculator usually performs processing to update a weight so as to reduce a square of an error between a known reference signal and the sum of complex multiplication of the reception signal by a calculated weight.

In the adaptive array processing, such a weight is adaptively updated (learning of weight) in accordance with time and fluctuation in a property of a propagation path for a signal radio wave, whereby an interfering component or noise is eliminated from the reception signal so as to extract the reception signal from a desired transmission station.

Technique for such adaptive array processing with MMSE as well as the RLS algorithm and the UWS algorithm with MMSE are well known, and described in detail, for example, in Nobuyoshi Kikuma, "Adaptive Signal Processing by Array Antenna," Kagaku Gijutsu Shuppan, pp. 35–49, published on Nov. 25, 1998.

As described above, in the radio reception apparatus with a function of adaptive array processing, a desired signal having an interfering component or noise eliminated from a reception signal can be obtained.

On the other hand, in the radio reception apparatus with a function of adaptive array processing, adaptive array processing is always performed even when it is not necessary, such as when a desired signal can be obtained without adaptive array processing because the reception signal does not contain much interfering component or noise, or when the interfering component or noise in the reception signal cannot be eliminated even with the adaptive array processing.

Meanwhile, in the adaptive array processing, numerous operational processings are performed for a plurality of signals received at a plurality of antennas, resulting in large power consumption. As more power is consumed, a stand-by period or a continuous call time is shortened in particular in a radio reception apparatus on the mobile terminal side driven by a battery.

SUMMARY OF THE INVENTION

An object of the present invention is to provide a radio reception apparatus capable of avoiding unnecessary power consumption as a result of unnecessary adaptive array processing, as well as a method and a program for controlling adaptive array processing in the radio reception apparatus.

According to one aspect of the present invention, a radio reception apparatus includes: a plurality of antennas; RF reception units provided corresponding to each antenna and performing amplification and frequency conversion of signals received at each antenna; an adaptive array operational processing unit performing adaptive array operational processing on signals output from the plurality of RF reception units; and a control unit. The control unit selects from a first mode in which adaptive array processing is performed and a second mode in which adaptive array processing is not performed, in accordance with a prescribed condition. When the first mode is selected, the control unit performs first control to operate the plurality of RF reception units and the adaptive array operational processing unit. When the second mode is selected, the control unit performs second control so that one RF reception unit is selected as a first RF reception unit to operate and an operation of an RF reception unit other than the first RF reception unit and the adaptive array operational processing unit is stopped.

Preferably, each RF reception unit further detects a level of a reception signal received at a corresponding antenna, and outputs the detected reception signal level to the control unit. The control unit selects the first mode when a difference between a highest level and a lowest level among the detected reception signal levels is not larger than a prescribed value, and selects the second mode when the difference between the highest level and the lowest level is larger than the prescribed value.

Preferably, each RF reception unit further detects a level of a reception signal received at a corresponding antenna, and outputs the detected reception signal level to the control unit. The control unit selects the first mode when all reception signal levels of the detected reception signal levels are lower than a prescribed value, and selects the second mode when a level of at least one reception signal is not lower than the prescribed value.

Preferably, the radio reception apparatus further includes a demodulation unit demodulating a signal processed by the adaptive array operational processing unit while the first mode is selected, and a communication quality calculating unit calculating communication quality based on the demodulated signal. While the first mode is selected, the control unit maintains the first mode when communication quality is not higher than prescribed quality, and selects the second mode when the communication quality is higher than the prescribed quality.

Preferably, the radio reception apparatus further includes a demodulation unit demodulating a signal processed by the first RF reception unit and not processed by the adaptive array operational processing unit while the second mode is selected, and a communication quality calculating unit calculating communication quality based on the demodulated signal. While the second mode is selected, the control unit selects the first mode when communication quality is not higher than prescribed quality, and maintains the second mode when the communication quality is higher than the prescribed quality.

Preferably, the radio reception apparatus further includes an input portion through which selection from the first mode and the second mode is input by user manipulation. The control unit selects the first mode when selection of the first mode is input through the input portion, and selects the second mode when selection of the second mode is input through the same.

Preferably, each RF reception unit further detects a level of a reception signal received at a corresponding antenna, and outputs the detected reception signal level to the control unit. The control unit selects as a first RF reception unit, an RF reception unit that has output a level highest among the detected reception signal levels when the second mode is selected.

Preferably, the control unit selects a predetermined RF reception unit as a first RF reception unit when the second mode is selected.

According to another aspect of the present invention, a method of controlling adaptive array processing in a radio reception apparatus which includes a plurality of antennas, RF reception units provided corresponding to each antenna and performing amplification and frequency conversion of signals received at each antenna, and an adaptive array operational processing unit performing adaptive array operational processing on signals output from the plurality of RF reception units, includes the steps of: selecting from a first mode in which adaptive array processing is performed and a second mode in which adaptive array processing is not performed, in accordance with a prescribed condition; and performing control in which, when the first mode is selected, first control is performed to operate the plurality of RF reception units and the adaptive array operational processing unit, and when the second mode is selected, second control is performed so that one RF reception unit is selected as a first RF reception unit to operate and that an operation of an RF reception unit other than the first RF reception unit and the adaptive array operational processing unit is stopped.

Preferably, the method of controlling adaptive array processing further includes the step of detecting a level of a reception signal received at a corresponding antenna. In the step of selecting, the first mode is selected when a difference between a highest level and a lowest level among the detected reception signal levels is not larger than a prescribed value, and the second mode is selected when the difference between the highest level and the lowest level is larger than the prescribed value.

Preferably, the method of controlling adaptive array processing further includes the step of detecting a level of a reception signal received at a corresponding antenna. In the step of selecting, the first mode is selected when all reception signal levels of the detected reception signal levels are lower than a prescribed value, and the second mode is selected when a level of at least one reception signal is not lower than the prescribed value.

Preferably, the method of controlling adaptive array processing further includes the steps of demodulating a signal processed by the adaptive array operational processing unit while the first mode is selected, and calculating communication quality based on the demodulated signal. In the step of selecting, while the first mode is selected, the first mode is maintained when communication quality is not higher than prescribed quality, and the second mode is selected when the communication quality is higher than the prescribed quality.

Preferably, the method of controlling adaptive array processing further includes the steps of demodulating a signal processed by the first RF reception unit and not processed by the adaptive array operational processing unit while the second mode is selected, and calculating communication quality based on the demodulated signal. In the step of selecting, while the second mode is selected, the first mode is selected when communication quality is not higher than prescribed quality, and the second mode is maintained when the communication quality is higher than the prescribed quality.

Preferably, the method of controlling adaptive array processing further includes the step of inputting selection from the first mode and the second mode by user manipulation. In the step of selecting, the first mode is selected when selection of the first mode is input, and the second mode is selected when selection of the second mode is input.

Preferably, the method of controlling adaptive array processing further includes the step of detecting a level of a reception signal received at a corresponding antenna. In the step of controlling, when the second mode is selected, an RF reception unit that has output a level highest among the detected reception signal levels is selected as a first RF reception unit.

Preferably, in the controlling step, a predetermined RF reception unit is selected as a first RF reception unit when the second mode is selected.

According to yet another aspect of the present invention, a program for controlling adaptive array processing in a radio reception apparatus which includes a plurality of antennas, RF reception units provided corresponding to each antenna and performing amplification and frequency conversion of signals received at each antenna, and an adaptive array operational processing unit performing adaptive array operational processing on signals output from the plurality of RF reception units, causes a computer to execute the steps of: selecting from a first mode in which adaptive array processing is performed and a second mode in which adaptive array processing is not performed, in accordance with a prescribed condition; and performing control in which, when the first mode is selected, first control is performed to operate the plurality of RF reception units and the adaptive array operational processing unit, and when the second mode is selected, second control is performed so that one RF reception unit is selected as a first RF reception unit to operate and that an operation of an RF reception unit other than the first RF reception unit and the adaptive array operational processing unit is stopped.

Preferably, each RF reception unit further detects a level of a reception signal received at a corresponding antenna. In the step of selecting, the first mode is selected when a difference between a highest level and a lowest level among the detected reception signal levels is not larger than a prescribed value, and the second mode is selected when the difference between the highest level and the lowest level is larger than the prescribed value.

Preferably, each RF reception unit further detects a level of a reception signal received at a corresponding antenna. In the step of selecting, the first mode is selected when all reception signal levels of the detected reception signal levels are lower than a prescribed value, and the second mode is selected when a level of at least one reception signal is not lower than the prescribed value.

Preferably, the program for controlling adaptive array processing further causes a computer to execute the steps of demodulating a signal processed by the adaptive array operational processing unit while the first mode is selected, and calculating communication quality based on the demodulated signal. In the step of selecting, while the first mode is selected, the first mode is maintained when communication quality is not higher than prescribed quality, and the second mode is selected when the communication quality is higher than the prescribed quality.

As described above, the present invention can avoid unnecessary power consumption as a result of unnecessary adaptive array processing.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described in detail with reference to the figures.

[First Embodiment]

Figure 1:
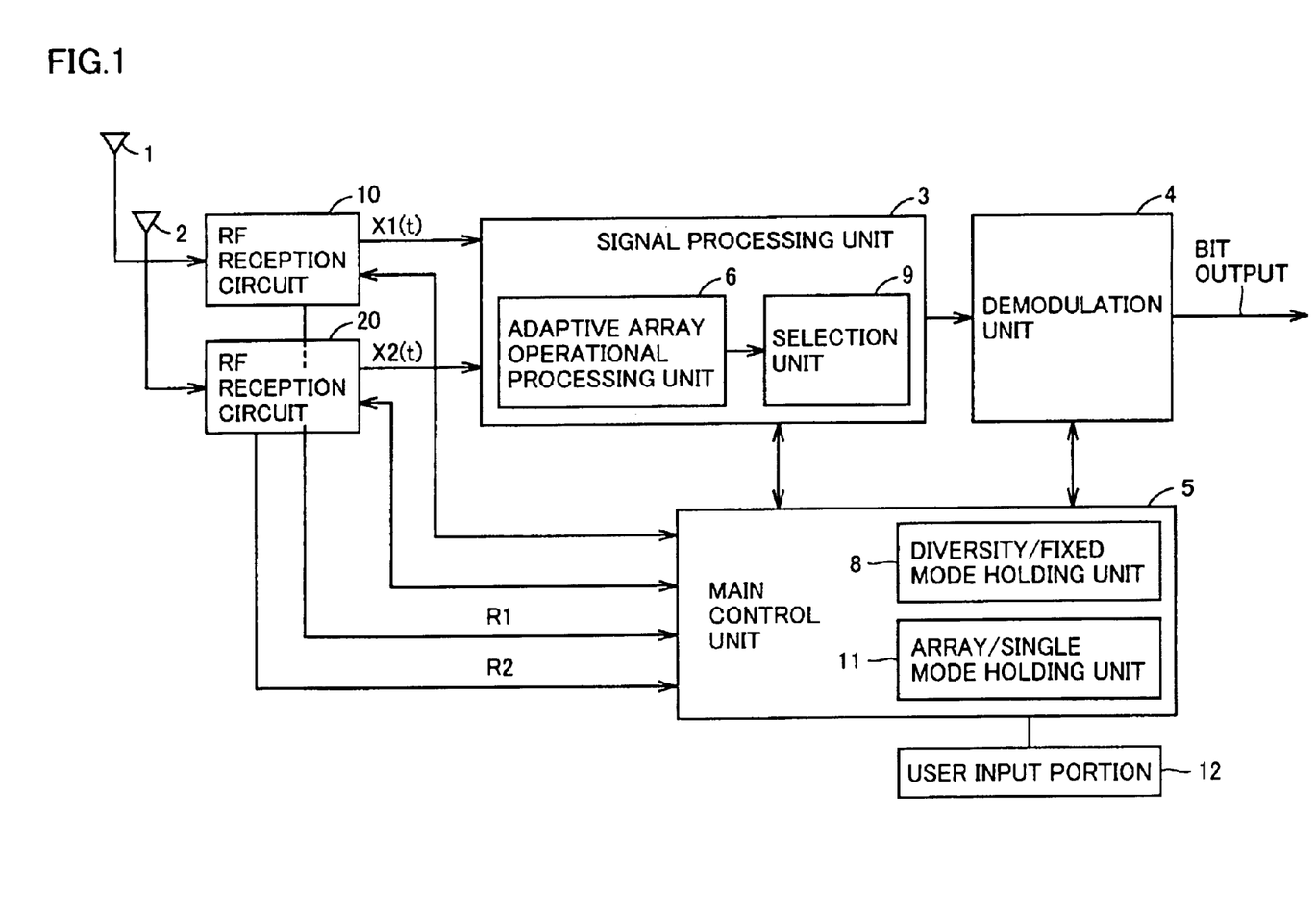
FIG. 1 is a functional block diagram showing a configuration of a radio reception terminal according to the first embodiment.

FIG. 1 is a functional block diagram showing a configuration of a radio reception terminal according to the first embodiment. Referring to FIG. 1, the radio reception terminal includes antennas 1, 2, RF (Radio Frequency) reception circuits 10, 20, a signal processing unit 3, a demodulation unit 4, a main control unit 5, and a user input portion 12.

Downlink radio signals from a not-shown base station are received by antennas 1, 2 respectively, and in turn provided to corresponding RF reception circuits 10, 20 as RF signals having a radio frequency.

RF reception circuit 10 subjects the RF signal received by antenna 1 to prescribed analog processing such as amplification or frequency conversion, and provides a generated signal X1(t) to signal processing unit 3.

RF reception circuit 10 includes a not-shown RSSI detecting unit, which detects a received signal strength indicator (RSSI) of the RF signal received by antenna 1 for output as a reception level R1.

RF reception circuit 20 subjects the RF signal received by antenna 2 to prescribed analog processing such as amplification or frequency conversion, and provides a generated signal X2(t) to signal processing unit 3.

RF reception circuit 20 includes a not-shown RSSI detecting unit, which detects a received signal strength indicator (RSSI) of the RF signal received by antenna 2 for output as a reception level R2.

Signal Processing unit 3 includes an adaptive array operational processing unit 6.

Figure 2:
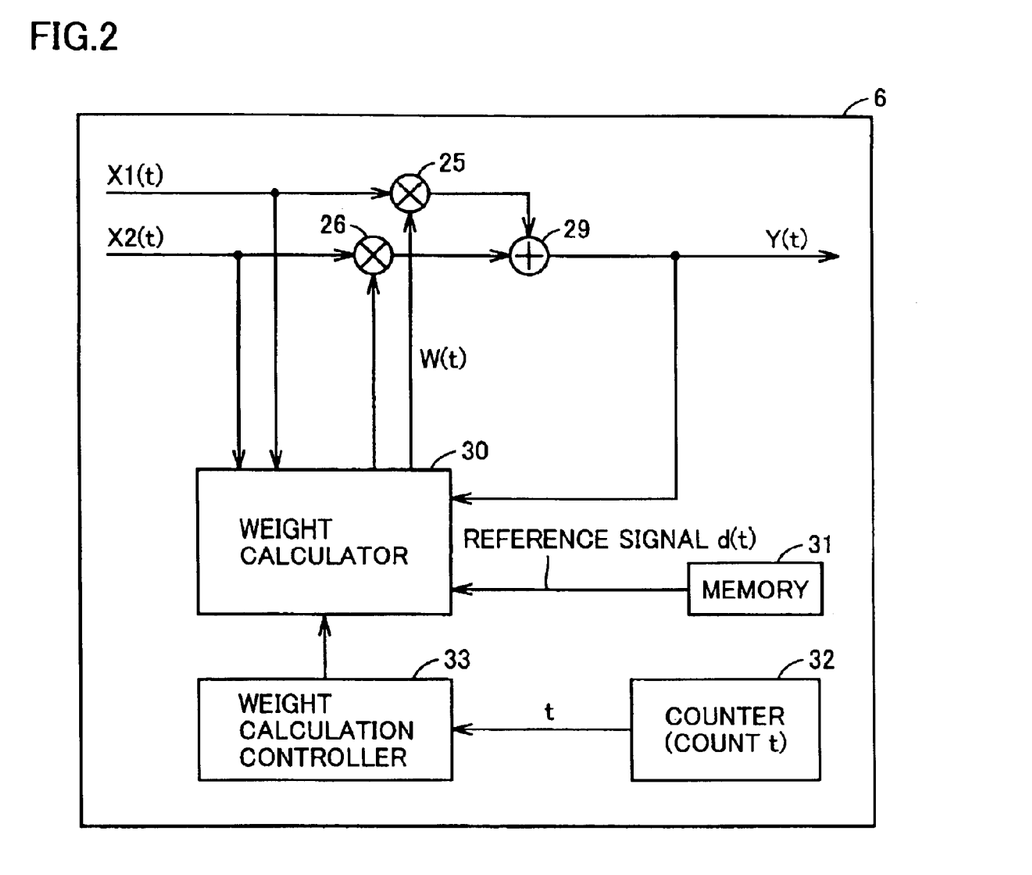
FIG. 2 is a functional block diagram of an adaptive array operational processing unit 6.

FIG. 2 is a functional block diagram of adaptive array operational processing unit 6.

Referring to FIG. 2, reception signals from antennas 1, 2 amplified by RF reception circuits 10, 20 respectively are converted to digital signals by a not-shown A/D converter.

These digital signals are provided to a DSP in a radio reception system, and subjected to adaptive array processing with software according to the functional block diagram shown in FIG. 2.

In the adaptive array processing, based on a reception signal, a weight vector consisting of reception coefficients (weight) for each antenna is calculated for adaptive control, so as to accurately extract a signal from a desired mobile terminal.

Referring back to FIG. 2, reception signal vectors X(t) (=X1(t), X2(t)) are provided to respective one inputs of multipliers 25, 26 as well as to a weight calculator 30.

Weight calculator 30 calculates a weight vector W(t) consisting of weights for each antenna in accordance with an algorithm described later, and provides the weight vector to the other inputs of multipliers 25, 26 respectively, followed by complex multiplication by reception signal vectors X(t) from corresponding antennas respectively.

An adder 29 provides the total sum Y(t) of the multiplication result, which is expressed as the sum of complex multiplication as in the following:

$$Y(t)=W(t)^H X(t)$$

where $W(t)^H$ represents transpose of a complex conjugate of weight vector W(t).

The result Y(t) of the sum of complex multiplication as described above is provided to weight calculator 30, and an error between the result and an already-known reference signal d(t) stored in advance in a memory 31 can be found. Reference signal d(t) is an already-known signal common to all reception signals. For example, in PHS, a preamble section configured with an already-known bit string in the reception signal is employed.

Weight calculator 30 performs processing to update the weight coefficient so as to decrease a square of the calculated error under the control of a weight calculation controller 33. In the adaptive array processing, update of the weight vector learning of weight) as described above is adaptively performed in accordance with time or fluctuation in a property of a propagation path for a signal radio wave, so as to eliminate an interfering component from reception signal X(t) and extract signal Y(t) from a desired mobile terminal.

Since a technique for such adaptive array processing with MMSE as well as the RLS algorithm and the LMS algorithm with MMSE are well known as previously described, description thereof will not be provided.

Referring again to FIG. 1, under the control of main control unit 5, demodulation unit 4 performs demodulation processing on the reception signal processed by signal processing unit 3 and outputs a demodulated bit.

User input portion 12 is used for input of selection from a selective diversity reception mode and a fixed antenna reception mode. When the fixed antenna reception mode is input, user input portion 12 further accepts an input of a number of a fixed antenna.

Main control unit 5 includes a diversity/fixed mode holding unit 8 and an array/single mode holding unit 11.

Array/single mode holding unit 11 holds an adaptive array reception mode or a single route reception mode.

Diversity/fixed mode holding unit 8 holds the selective diversity reception mode or the fixed antenna reception mode. When the fixed antenna reception mode is held, diversity/fixed mode holding unit 8 holds a number of the fixed antenna.

In accordance with the input from user input portion 12, main control unit 5 writes a mode (the selective diversity reception mode or the fixed antenna reception mode) in diversity/fixed mode holding unit 8, and writes also the number of fixed antenna in the same when the fixed antenna reception mode is selected.

Main control unit 5 obtains reception level R1 of antenna 1 from RF reception circuit 10 and reception level R2 of antenna 2 from RF reception circuit 20. Main control unit 5 calculates difference d between reception level R1 of antenna 1 and reception level R2 of antenna 2 (=|R2−R1|).

When difference d is equal to or lower than a prescribed value Ref1, main control unit 5 selects the adaptive array reception mode and sets the mode in array/single mode holding unit 11 to the adaptive array reception mode. On the other hand, when difference d is larger than prescribed value Ref1, main control unit 5 selects the single route reception mode, and sets the mode in array/single mode holding unit 11 to the single route reception mode. Such selection is made because the interfering component in the reception signal cannot be eliminated even with the adaptive array processing if there is a significant difference between a reception level of a signal received by one antenna and a reception level of a signal received by another antenna.

When the adaptive array reception mode is selected, main control unit 5 operates adaptive array operational processing unit 6, and causes a selection unit 9 to select an output of adaptive array operational processing unit 6.

When the single route reception mode is selected, main control unit 5 stops an operation of adaptive array operational processing unit 6, and causes a next processing to be performed in accordance with the mode in diversity/fixed mode holding unit 8. When the mode in diversity/fixed mode holding unit 8 is set to the antenna fixed reception mode, main control unit 5 stops an operation of an RF reception circuit other than the RF reception circuit for the antenna corresponding to the fixed antenna number held in diversity/fixed mode holding unit 8, and causes selection unit 9 to select an output of the RF reception circuit for the antenna corresponding to the fixed antenna number. When the mode in diversity/fixed mode holding unit 8 is set to the selective diversity reception mode, main control unit 5 stops an operation of an RF reception circuit having a lower reception level, and causes selection unit 9 to select an output of the RF reception circuit having a higher reception level.

(Operation)

Figure 3:
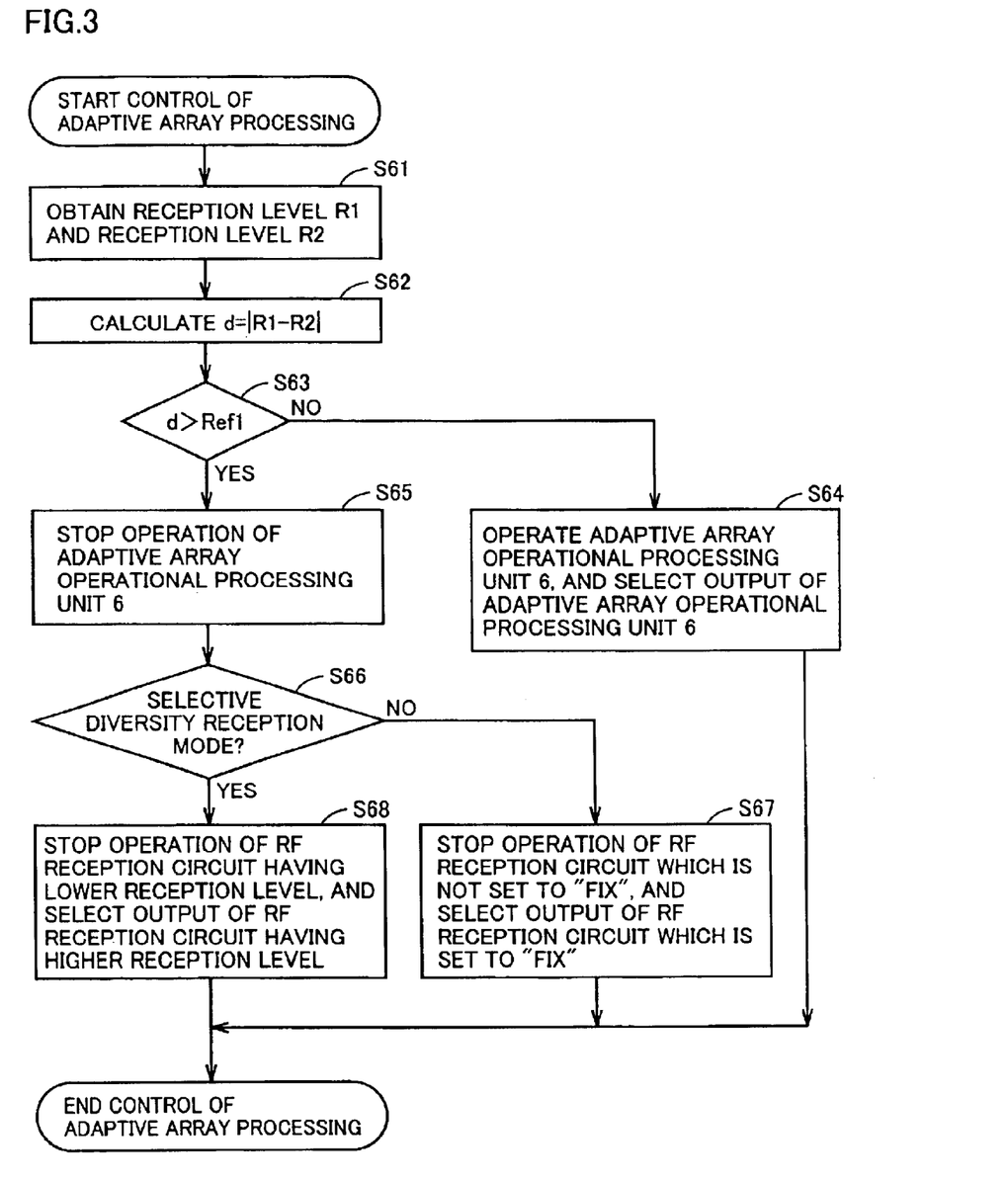
FIG. 3 is a flowchart showing an operation procedure of adaptive array processing control by a main control unit 5 executed with software by a DSP of the radio reception terminal according to the first embodiment.

An operation of main control unit 5 in the radio reception terminal according to the first embodiment will now be described. FIG. 3 is a flowchart showing an operation procedure of adaptive array processing control by main control unit 5 executed with software by a DSP of the radio reception terminal according to the first embodiment. The DSP reads the program containing each step in the flowchart shown in FIG. 3 from a not-shown memory and executes the same. The program can externally be installed.

Initially, main control unit 5 obtains reception level R1 of antenna 1 from RF reception circuit 10 and reception level R2 of antenna 2 from RF reception circuit 20 (step S61).

Main control unit 5 calculates difference d between reception level R1 of antenna 1 and reception level R2 of antenna 2 (=|R2−R1|) (step S62).

When difference d is equal to or lower than prescribed value Ref1, main control unit 5 selects the adaptive array reception mode, and sets the mode in array/single mode holding unit 11 to the adaptive array reception mode. In addition, main control unit 5 operates adaptive array operational processing unit 6, and causes selection unit 9 to select an output of adaptive array operational processing unit 6 (steps S63, S64).

When difference d is larger than prescribed value Ref1, main control unit 5 selects the single route reception mode, sets the mode in array/single mode holding unit 11 to the single route reception mode, and stops an operation of adaptive array operational processing unit 6 (steps S63, S65).

When the mode in diversity/fixed mode holding unit 8 is set to the antenna fixed reception mode, main control unit 5 stops an operation of an RF reception circuit other than the RF reception circuit for the antenna corresponding to the fixed antenna number held in diversity/fixed mode holding unit 8, and causes selection unit 9 to select an output of the RF reception circuit for the antenna corresponding to the fixed antenna number (steps S66, S67).

When the mode in diversity/fixed mode holding unit 8 is set to the selective diversity reception mode, main control unit 5 stops an operation of an RF reception circuit having a lower reception level, and causes selection unit 9 to select an output of the RF reception circuit having a higher reception level (steps S66, S68).

As described above, in the radio reception terminal according to the present embodiment, when difference d between reception level R1 of antenna 1 and reception level R2 of antenna 2 is not larger than prescribed value Ref1, main control unit 5 selects the adaptive array reception mode. When difference d is larger than prescribed value Ref1, main control unit 5 selects the single route reception mode. When the single route reception mode is selected, main control unit 5 stops an operation of adaptive array operational processing unit 6. Therefore, unnecessary power consumption as a result of unnecessary adaptive array operational processing can be avoided.

In addition, while the mode in diversity/fixed mode holding unit 8 is set to the selective diversity reception mode, main control unit 5 stops an operation of an RF reception circuit having a lower reception level when the single route reception mode is selected. Therefore, unnecessary power consumption as a result of unnecessary radio reception processing (amplification and frequency conversion processing) can be avoided.

Moreover, while the mode in diversity/fixed mode holding unit 8 is set to the antenna fixed reception mode, main control unit 5 stops an operation of an RF reception circuit other than the RF reception circuit for the antenna corresponding to the fixed antenna number when the single route reception mode is selected. Therefore, unnecessary power consumption as a result of unnecessary radio reception processing (amplification and frequency conversion processing) and diversity selection processing (processing for comparison of reception levels) can be avoided.

As described above, according to the radio reception terminal in the present embodiment, unnecessary power consumption as a result of unnecessary adaptive array processing can be avoided.

[Second Embodiment]

Figure 4:
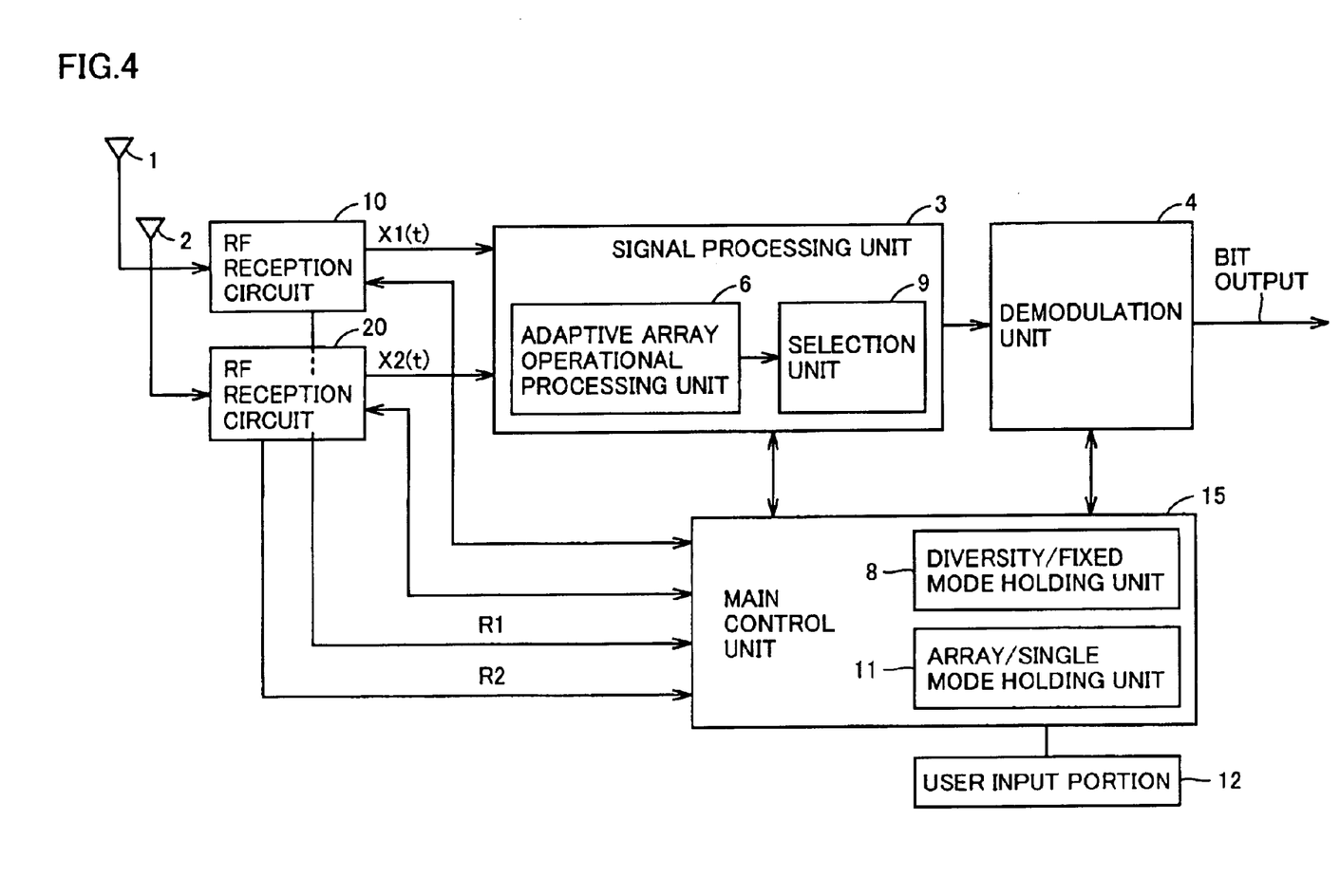
FIG. 4 is a functional block diagram showing a configuration of a radio reception terminal according to the second embodiment.

FIG. 4 is a functional block diagram showing a configuration of a radio reception terminal according to the second embodiment of the present invention. The functional block diagram shown here is the same as that according to the first embodiment shown in FIG. 1 except for the following points. Therefore, description of common or corresponding components will not be repeated.

In the functional block diagram in FIG. 4, a main control unit 15 is provided instead of main control unit 5 in FIG. 1.

Main control unit 15 is different from main control unit 5 in a determination condition based for selection from the adaptive array reception mode and the single route reception mode.

When reception levels R1 and R2 of antennas 1 and 2 are both lower than a prescribed value Ref2, main control unit 15 selects the adaptive array reception mode. When one reception level is equal to or higher than prescribed value Ref2, main control unit 15 selects the single route reception mode. The reason for such selection is as follows. If a reception level of a signal received by a certain antenna is high, the reception signal does not contain much interfering component or noise. In other words, it is likely that the reception signal of that antenna is a desired signal without the adaptive array processing.

(Operation)

Figure 5:
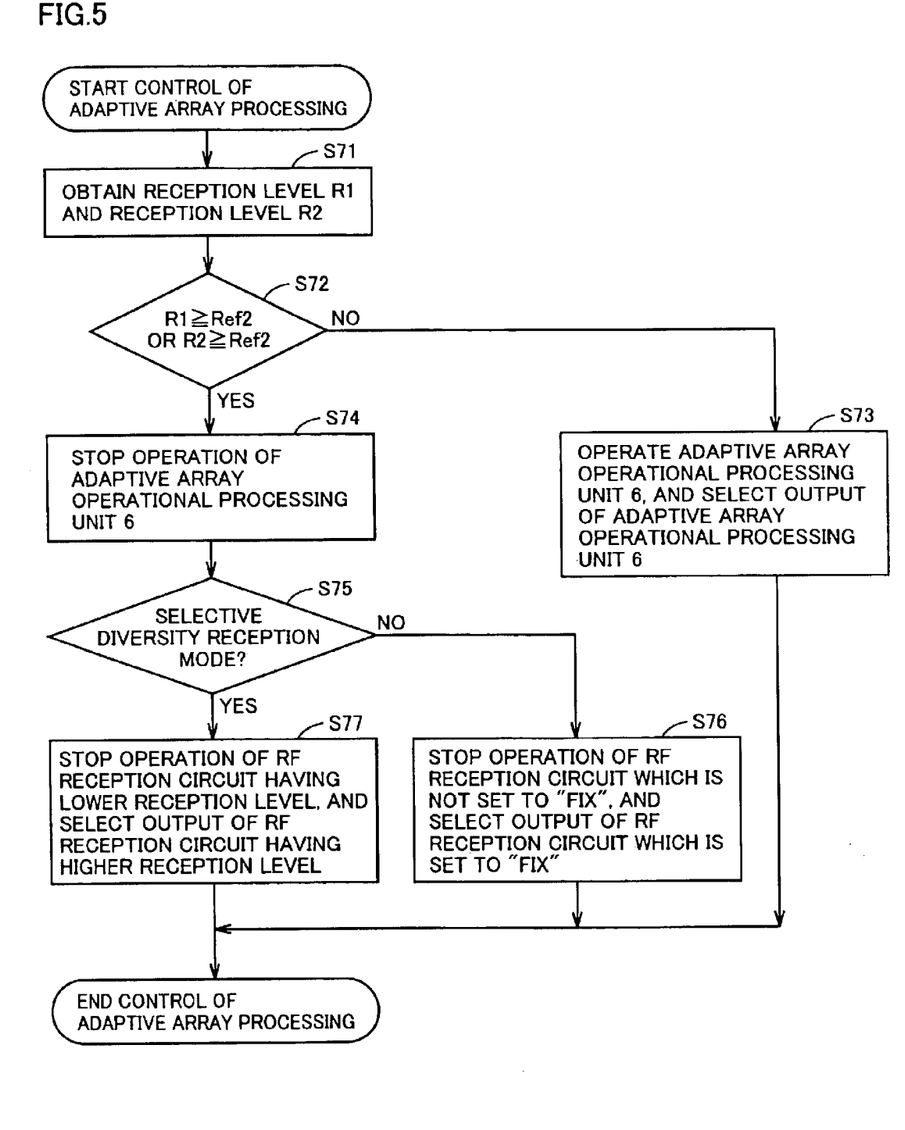
FIG. 5 is a flowchart showing an operation procedure of adaptive array processing control by a main control unit 15 executed with software by a DSP of the radio reception terminal according to the second embodiment.

An operation of the radio reception terminal according to the second embodiment will now be described. FIG. 5 is a flowchart showing an operation procedure of adaptive array processing control executed with software by a DSP of the radio reception terminal according to the second embodiment. The DSP reads the program containing each step in the flowchart shown in FIG. 5 from a not-shown memory and executes the same. The program can externally be installed.

Initially, main control unit 15 obtains reception level R1 of antenna 1 from RF reception circuit 10 and reception level R2 of antenna 2 from RF reception circuit 20 (step S71).

When reception levels R1 and R2 of antennas 1 and 2 are both lower than prescribed value Ref2, main control unit 15 selects the adaptive array reception mode, and sets the mode in array/single mode holding unit 11 to the adaptive array reception mode. In addition, main control unit 15 operates adaptive array operational processing unit 6, and causes selection unit 9 to select an output of adaptive array operational processing unit 6 (steps S72, S73).

When one reception level is equal to or higher than prescribed value Ref2, main control unit 15 selects the single route reception mode, sets the mode in array/single mode holding unit 11 to the single route reception mode, and stops an operation of adaptive array operational processing unit 6 (steps S72, S74).

While the mode in diversity/fixed mode holding unit 8 is set to the antenna fixed reception mode, main control unit 15 stops an operation of an RF reception circuit other than the RF reception circuit for the antenna corresponding to the fixed antenna number held in diversity/fixed mode holding unit 8, and causes selection unit 9 to select an output of the RF reception circuit for the antenna corresponding to the fixed antenna number (steps S75, S76).

When the mode in diversity/fixed mode holding unit 8 is set to the selective diversity reception mode, main control unit 15 stops an operation of an RF reception circuit having a lower reception level, and causes selection unit 9 to select an output of the RF reception circuit having a higher reception level (steps S75, S77).

As described above, in the radio reception terminal according to the present embodiment, when reception levels R1 and R2 of antennas 1 and 2 are both lower than prescribed value Ref2, main control unit 15 selects the adaptive array reception mode. When one reception level is equal to or higher than prescribed value Ref2, main control unit 15 selects the single route reception mode. When the single route reception mode is selected, main control unit 15 stops an operation of adaptive array operational processing unit 6. Therefore, unnecessary power consumption as a result of unnecessary adaptive array operational processing can be avoided.

In addition, while the mode in diversity/fixed mode holding unit 8 is set to the selective diversity reception mode, main control unit 15 stops an operation of an RF reception circuit having a lower reception level when the single route reception mode is selected. Therefore, unnecessary power consumption as a result of unnecessary radio reception processing (amplification and frequency conversion processing) can be avoided.

Moreover, while the mode in diversity/fixed mode holding unit 8 is set to the antenna fixed reception mode, main control unit 15 stops an operation of an RF reception circuit other than the RF reception circuit for the antenna corresponding to the fixed antenna number when the single route reception mode is selected. Therefore, unnecessary power consumption as a result of unnecessary radio reception processing (amplification and frequency conversion processing) and diversity selection processing (processing for comparison of reception levels) can be avoided.

As described above, according to the radio reception terminal in the present embodiment, unnecessary power consumption as a result of unnecessary adaptive array processing can be avoided.

[Third Embodiment]

Figure 6:
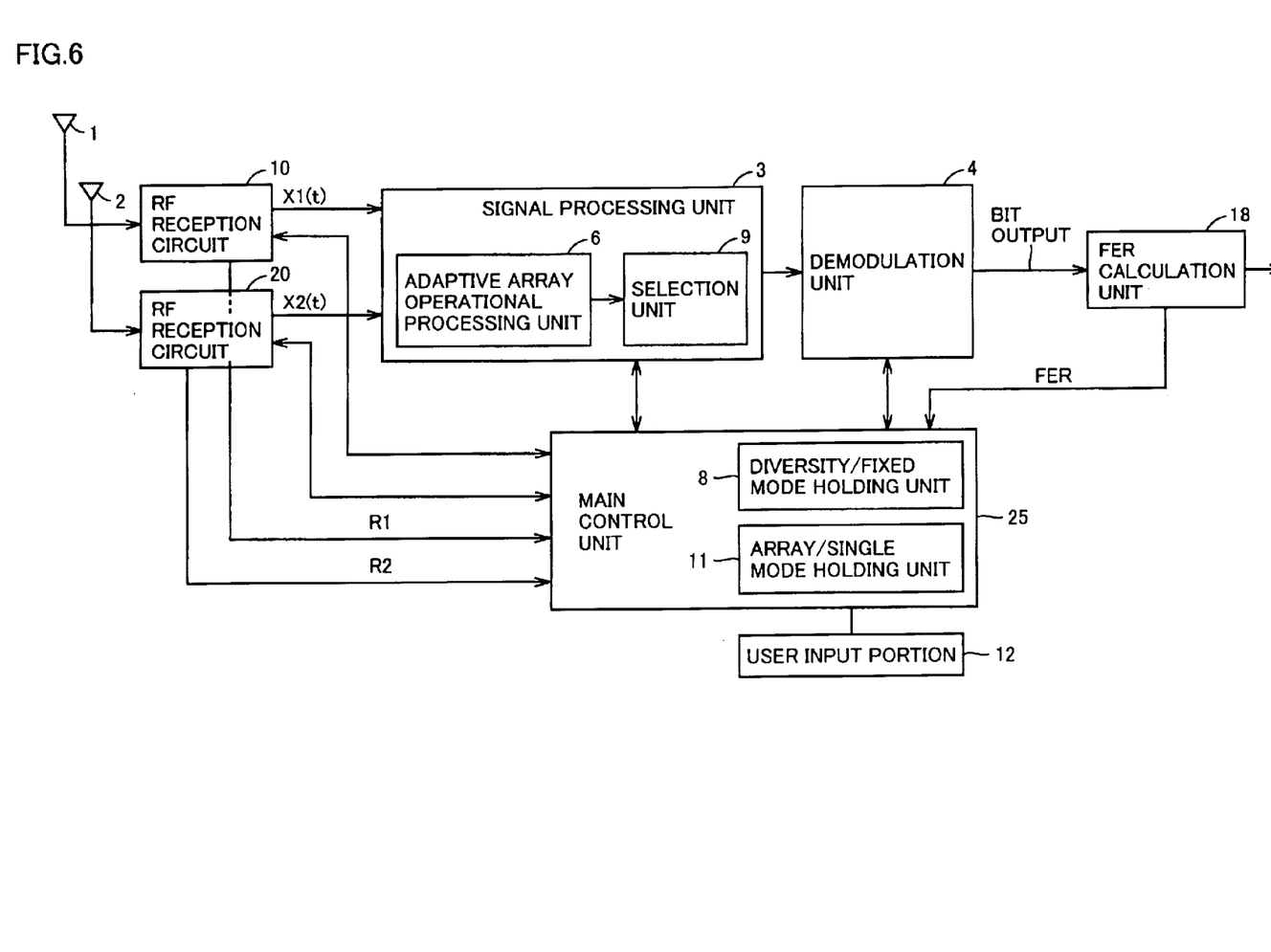
FIG. 6 is a functional block diagram showing a configuration of a radio reception terminal according to the third embodiment.

FIG. 6 is a functional block diagram showing a configuration of a radio reception terminal according to the third embodiment of the present invention. The functional block diagram shown in FIG. 6 is the same as that according to the first embodiment shown in FIG. 1 except for the following points. Therefore, description of common or corresponding components will not be repeated.

In the functional block diagram in FIG. 6, a main control unit 25 is provided instead of main control unit 5 in FIG. 1, and an FER (Frame Error Rate) calculating unit 18 is added.

FER calculating unit 18 counts the number of errors in a frame of the reception signal demodulated by demodulation unit 4. Thereafter, FER calculating unit 18 calculates a frame error rate FER, and outputs the rate to main control unit 25 as one element indicating communication quality for communication quality evaluation.

Main control unit 25 is different from main control unit 5 in a determination condition for selection from the adaptive array reception mode and the single route reception mode.

Main control unit 25 obtains frame error rate FER, and in accordance with frame error rate FER and the current mode held in array/single mode holding unit 11, it selects the adaptive array reception mode or the single route reception mode.

When the current mode in array/single mode holding unit 11 is set to the adaptive array reception mode and frame error rate FER is not smaller than a prescribed value Ref31, or when the current mode in array/single mode holding unit 11 is set to the single route reception mode and frame error rate FER is not smaller than a prescribed value Ref32, main control unit 25 selects the adaptive array reception mode.

In addition, when the current mode in array/single mode holding unit 11 is set to the single route reception mode and frame error rate FER is smaller than prescribed value Ref32, or when the current mode in array/single mode holding unit 11 is set to the adaptive array reception mode and frame error rate FER is smaller than prescribed value Ref31, main control unit 25 selects the single route reception mode.

Such selection is made for the following reason. If the frame error rate FER is small, the reception signal does not contain much interfering component or noise. In other words, it is likely that the reception signal of that antenna is a desired signal without the adaptive array processing.

(Operation)

Figure 7:
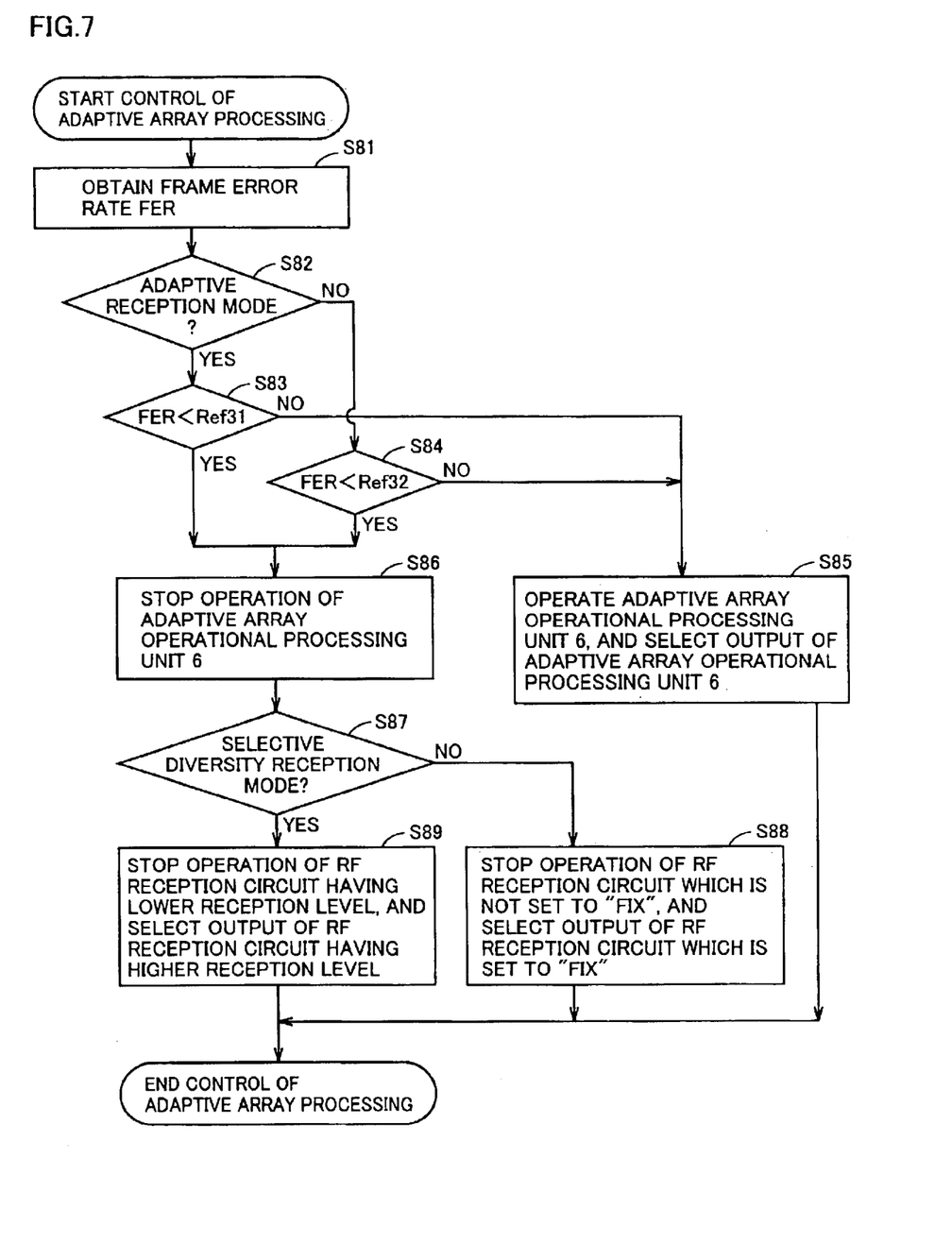
FIG. 7 is a flowchart showing an operation procedure of adaptive array processing control by a main control unit 25 executed with software by a DSP of the radio reception terminal according to the third embodiment.

An operation of the radio reception terminal according to the third embodiment will now be described. FIG. 7 is a flowchart showing an operation procedure of adaptive array processing control executed with software by a DSP of the radio reception terminal according to the third embodiment. The DSP reads the program containing each step in the flowchart shown in FIG. 7 from a not-shown memory and executes the same. The program can externally be installed.

Initially, main control unit 25 obtains frame error rate FER (step S81).

When the current mode in array/single mode holding unit 11 is set to the adaptive array reception mode and frame error rate FER is not smaller than prescribed value Ref31, or when the current mode in array/single mode holding unit 11 is set to the single route reception mode and frame error rate FER is not smaller than prescribed value Ref32, main control unit 25 selects the adaptive array reception mode, and sets the mode in array/single mode holding unit 11 to the adaptive array reception mode. In addition, main control unit 25 operates adaptive array operational processing unit 6, and causes selection unit 9 to select an output of adaptive array operational processing unit 6 (steps S82 to S85).

When the current mode in array/single mode holding unit 11 is set to the single route reception mode and frame error rate FER is smaller than prescribed value Ref32, or when the current mode in array/single mode holding unit 11 is set to the adaptive array reception mode and frame error rate FER is smaller than prescribed value Ref3 1, main control unit 25 selects the single route reception mode, sets the mode in array/single mode holding unit 11 to the single route reception mode, and stops an operation of adaptive array operational processing unit 6 (steps S82 to 84, S86).

When the mode in diversity/fixed mode holding unit 8 is set to the antenna fixed reception mode, main control unit 25 stops an operation of an RF reception circuit other than the RF reception circuit for the antenna corresponding to the fixed antenna number held in diversity/fixed mode holding unit 8, and causes selection unit 9 to select an output of the RF reception circuit for the antenna corresponding to the fixed antenna number (steps S87, S88).

When the mode in diversity/fixed mode holding unit 8 is set to the selective diversity reception mode, main control unit 25 stops an operation of an RF reception circuit having a lower reception level, and causes selection unit 9 to select an output of the RF reception circuit having a higher reception level (steps S87, S89).

As described above, in the radio reception terminal according to the present embodiment, when the current mode in array/single mode holding unit 11 is set to the adaptive array reception mode and frame error rate FER is not smaller than prescribed value Ref31, or when the current mode in array/single mode holding unit 11 is set to the single route reception mode and frame error rate FER is not smaller than prescribed value Ref32, main control unit 25 selects the adaptive array reception mode. When the current mode in array/single mode holding unit 11 is set to the single route reception mode and frame error rate FER is smaller than prescribed value Ref32, or when the current mode in array/single mode holding unit 11 is set to the adaptive array reception mode and frame error rate FER is smaller than prescribed value Ref31, main control unit 25 selects the single route reception mode.

When the single route reception mode is selected, main control unit 25 stops an operation of adaptive array operational processing unit 6. Therefore, unnecessary power consumption as a result of unnecessary adaptive array operational processing can be avoided.

In addition, while the mode in diversity/fixed mode holding unit 8 is set to the selective diversity reception mode, main control unit 25 stops an operation of an RF reception circuit having a lower reception level when the single route reception mode is selected. Therefore, unnecessary power consumption as a result of unnecessary radio reception processing (amplification and frequency conversion processing) can be avoided.

Moreover, while the mode in diversity/fixed mode holding unit 8 is set to the antenna fixed reception mode, main control unit 25 stops an operation of an RP reception circuit other than the RF reception circuit for the antenna corresponding to the fixed antenna number when the single route reception mode is selected. Therefore, unnecessary power consumption as a result of unnecessary radio reception processing (amplification and frequency conversion processing) and diversity selection processing (processing for comparison of reception levels) can be avoided.

As described above, according to the radio reception terminal in the present embodiment, unnecessary power consumption as a result of unnecessary adaptive array processing can be avoided.

[Fourth Embodiment]

Figure 8:
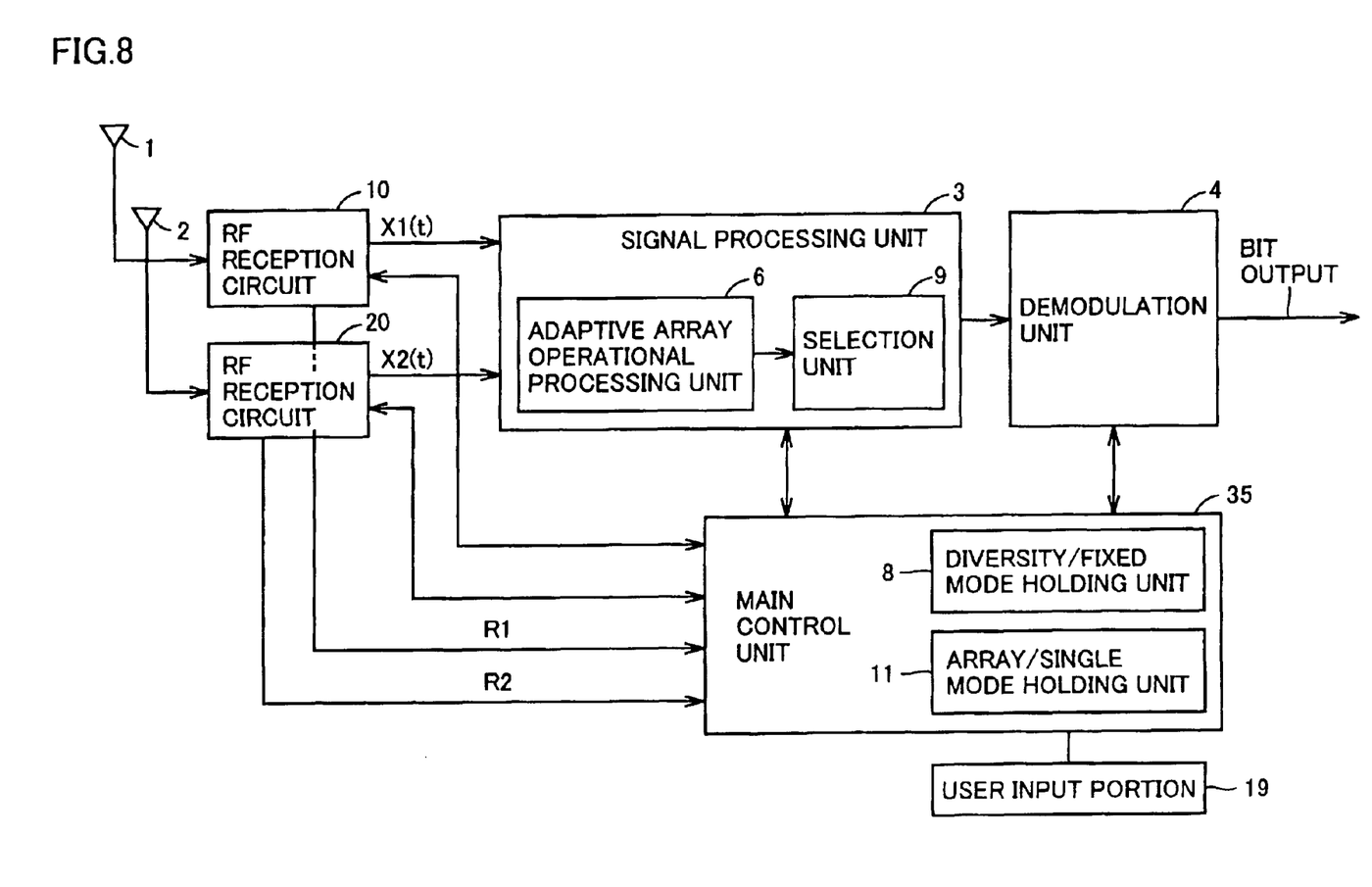
FIG. 8 is a functional block diagram showing a configuration of a radio reception terminal according to the fourth embodiment.

FIG. 8 is a functional block diagram showing a configuration of a radio reception terminal according to the fourth embodiment of the present invention. The functional block diagram shown in FIG. 8 is the same as that according to the first embodiment shown in FIG. 1 except for the following points. Therefore, description of common or corresponding components will not be repeated.

In the functional block diagram in FIG. 8, a main control unit 35 is provided instead of main control unit 5 in FIG. 1, and a user input portion 19 is added.

User input portion 19 serves not only for input of selection from the selective diversity reception mode and the fixed antenna reception mode by a user, but also for input of selection from the adaptive reception mode and the single route reception mode by the user.

Main control unit 35 is different from main control unit 5 in a determination condition for selection from the adaptive array reception mode and the single route reception mode.

When selection of the adaptive reception mode is input through user input portion 19, main control unit 35 selects the adaptive reception mode. When selection of the fixed antenna reception mode is input through user input portion 19, main control unit 35 selects the fixed antenna reception mode. Such selection is made for the following reasons. When the user selects the fixed antenna reception mode, the reception signal does not contain much interfering component or noise, and accordingly, the adaptive array processing is not necessary. Alternatively, error correction after demodulation is enhanced, and accordingly, interference or noise in the reception signal does not annoy the user.

(Operation)

Figure 9:
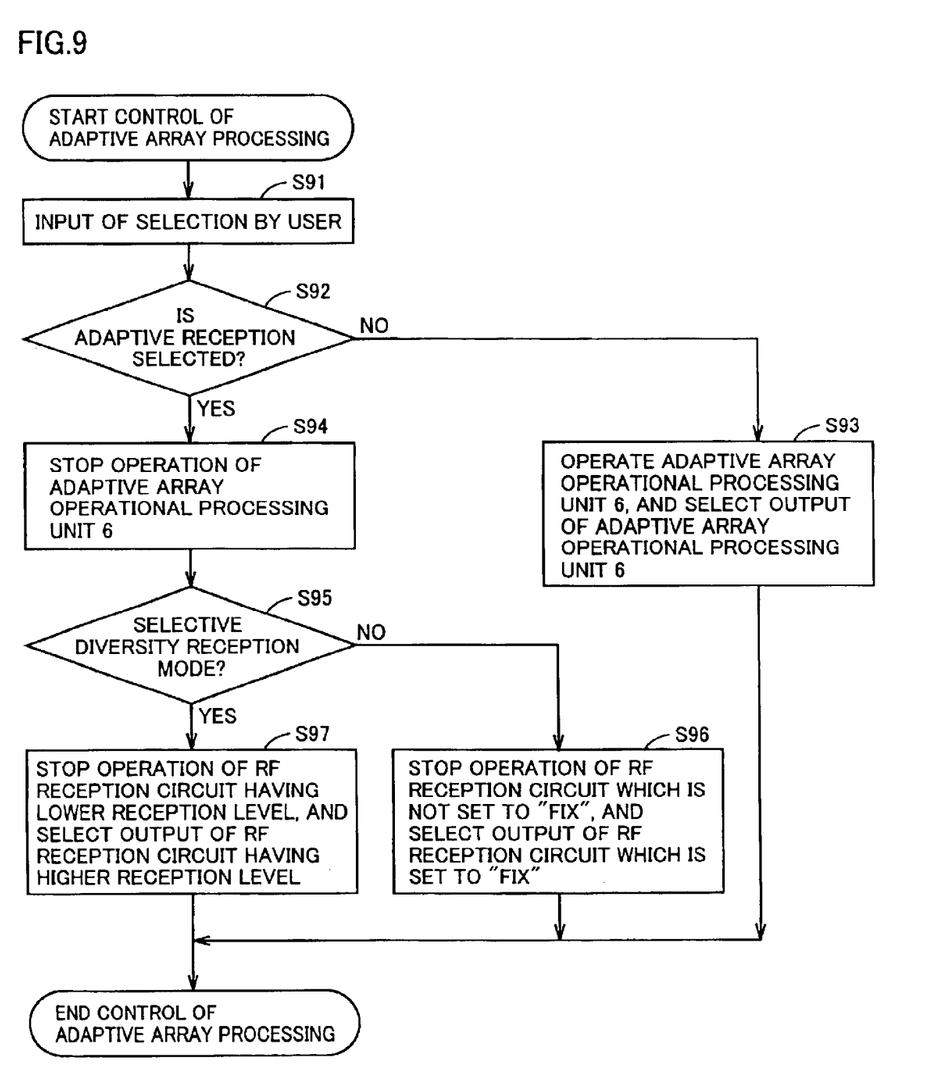
FIG. 9 is a flowchart showing an operation procedure of adaptive array processing control by a main control unit 35 executed with software by a DSP of the radio reception terminal according to the fourth embodiment.

An operation of the radio reception terminal according to the fourth embodiment will now be described. FIG. 9 is a flowchart showing an operation procedure of adaptive array processing control executed with software by a DSP of the radio reception terminal according to the fourth embodiment. The DSP reads the program containing each step in the flowchart shown in FIG. 9 from a not-shown memory and executes the same. The program can externally be installed.

Initially, main control unit 35 obtains an input of selection from the adaptive reception mode and the single route reception mode through user input portion 19 (step S91).

When selection of the adaptive reception mode is input, main control unit 35 selects the adaptive reception mode, and sets the mode in array/single mode holding unit 11 to the adaptive reception mode. In addition, main control unit 35 operates adaptive array operational processing unit 6, and causes selection unit 9 to select an output of adaptive array operational processing unit 6 (steps S92, S93).

When selection of the fixed antenna reception mode is input, main control unit 35 selects the fixed antenna reception mode, sets the mode in array/single mode holding unit 11 to the fixed reception mode, and stops an operation of adaptive array operational processing unit 6 (steps S92, S94).

When the mode in diversity/fixed mode holding unit 8 is set to the antenna fixed reception mode, main control unit 35 stops an operation of an RF reception circuit other than the RF reception circuit for the antenna corresponding to the fixed antenna number held in diversity/fixed mode holding unit 8, and causes selection unit 9 to select an output of the RF reception circuit of the antenna corresponding to the fixed antenna number (steps S95, S96).

When the mode in diversity/fixed mode holding unit 8 is set to the selective diversity reception mode, main control unit 35 stops an operation of an RF reception circuit having a lower reception level, and causes selection unit 9 to select an output of the RF reception circuit having a higher reception level (steps S95, S97).

As described above, in the radio reception terminal according to the present embodiment, when selection of the adaptive reception mode is input through user input portion 19, main control unit 35 selects the adaptive reception mode. When selection of the fixed antenna reception mode is input through user input portion 19, main control unit 35 selects the fixed antenna reception mode.

When the single route reception mode is selected, main control unit 35 stops an operation of adaptive array operational processing unit 6. Therefore, unnecessary power consumption as a result of unnecessary adaptive array operational processing can be avoided.

In addition, while the mode in diversity/fixed mode holding unit 8 is set to the selective diversity reception mode, main control unit 35 stops an operation of an RF reception circuit having a lower reception level when the single route reception mode is selected. Therefore, unnecessary power consumption as a result of unnecessary radio reception processing (amplification and frequency conversion processing) can be avoided.

Moreover, while the mode in diversity/fixed mode holding unit 8 is set to the antenna fixed reception mode, main control unit 35 stops an operation of an RF reception circuit other than the RF reception circuit for the antenna corresponding to the fixed antenna number when the single route reception mode is selected. Therefore, unnecessary power consumption as a result of unnecessary radio reception processing (amplification and frequency conversion processing) and diversity selection processing (processing for comparison of reception levels) can be avoided.

As described above, according to the radio reception terminal in the present embodiment, unnecessary power consumption as a result of unnecessary adaptive array processing can be avoided.

<Variation>

The present invention is not limited to the embodiments described above, but covers a variation as in the following.

(1) Example of Radio Reception Apparatus

Though a radio reception terminal has been described as an exemplary radio reception apparatus in the embodiments in the present invention, the radio reception apparatus is not limited thereto. The radio reception apparatus may be a reception apparatus on a radio base station side.

(2) Three or More Antennas

Though a radio reception apparatus having two antennas has been described in the present embodiments, adaptive array control as in an example of two antennas can be adapted to an example of three or more antennas.

In other words, in the first embodiment, when the difference between the highest reception level and the lowest reception level is equal to or smaller than a prescribed value, the adaptive array reception mode may be selected, and when the difference therebetween exceeds the prescribed value, the single route reception mode may be selected.

In addition, in the second embodiment, when at least one reception level is equal to or smaller than the prescribed value, the adaptive array reception mode is selected, and when all reception levels exceed the prescribed value, the single route reception mode may be selected.

(3) Communication Quality

Though frame error rate FER has been employed for indicating communication quality in the third embodiment, it is not limited thereto. For example, a bit error rate BER may be employed for indicating communication quality.

(4) REF31, REF32

In the third embodiment, transition to the single route reception mode while the current mode is set to the adaptive array reception mode takes place when frame error rate FER is smaller than prescribed value Ref31. In addition, transition to the adaptive array reception mode while the current mode is set to the single route reception mode takes place when frame error rate FER is equal to or larger than prescribed value Ref32. Here, prescribed values Ref1 and Ref2 may be set to any value. In other words, prescribed values Ref1 and Ref2 may be set to an identical value, or alternatively, one value may be larger than the other.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A radio reception apparatus, comprising:
   a plurality of antennas;
   RF reception units provided corresponding to each antenna and performing amplification and frequency conversion of signals received at each antenna;
   an adaptive array operational processing unit performing adaptive array operational processing on signals output from the plurality of RF reception units; and a control unit; wherein
  said control unit selects from a first mode in which adaptive array processing is performed and a second mode in which adaptive array processing is not performed, in accordance with a prescribed condition,
  when said first mode is selected, said control unit performs first control to operate said plurality of RF reception units and said adaptive array operational processing unit, and
  when said second mode is selected, said control unit performs second control so that one RF reception unit is selected as a first RF reception unit to operate and an operation of an RF reception unit other than said first RF reception unit and said adaptive array operational processing unit is stopped.

2. The radio reception apparatus according to claim 1, wherein
  said each RF reception unit further detects a level of a reception signal received at a corresponding antenna and outputs the detected reception signal level to said control unit, and
  said control unit selects said first mode when a difference between a highest level and a lowest level among said detected reception signal levels is equal to or lower than a prescribed value, and selects said second mode when the difference between the highest level and the lowest level is larger than said prescribed value.

3. The radio reception apparatus according to claim 1, wherein
  said each RF reception unit further detects a level of a reception signal received at a corresponding antenna and outputs the detected reception signal level to said control unit, and
  said control unit selects said first mode when all reception signal levels of said detected reception signal levels are lower than a prescribed value, and selects said second mode when a level of at least one reception signal is equal to or higher than said prescribed value.

4. The radio reception apparatus according to claim 1, further comprising a demodulation unit demodulating a signal processed by said adaptive array operational processing unit while said first mode is selected, and a communication quality calculating unit calculating communication quality based on said demodulated signal, wherein
  while said first mode is selected, said control unit maintains said first mode when communication quality is not higher than prescribed quality, and selects said second mode when said communication quality is higher than the prescribed quality.

5. The radio reception apparatus according to claim 1, further comprising a demodulation unit demodulating a signal processed by said first RF reception unit and not processed by said adaptive array operational processing unit while said second mode is selected, and a communication quality calculating unit calculating communication quality based on said demodulated signal, wherein
  while said second mode is selected, said control unit selects said first mode when communication quality is not higher than prescribed quality, and maintains said second mode when said communication quality is higher than the prescribed quality.

6. The radio reception apparatus according to claim 1, further comprising an input portion through which selection from said first mode and said second mode is input by user manipulation, wherein
  said control unit selects said first mode when selection of said first mode is input through said input portion and selects said second mode when selection of said second mode is input through the same.

7. The radio reception apparatus according to claim 1, wherein
  said each RF reception unit further detects a level of a reception signal received at a corresponding antenna and outputs the detected reception signal level to said control unit, and
  said control unit selects as a first RF reception unit, an RF reception unit that has output a level highest among said detected reception signal levels when said second mode is selected.

8. The radio reception apparatus according to claim 1, wherein
  said control unit selects a predetermined RF reception unit as a first RF reception unit when said second mode is selected.

9. A method of controlling adaptive array processing in a radio reception apparatus which includes a plurality of antennas, RF reception units provided corresponding to each antenna and performing amplification and frequency conversion of signals received at each antenna, and an adaptive array operational processing unit performing adaptive array operational processing on signals output from the plurality of RF reception units, comprising the steps of:
  selecting from a first mode in which adaptive array processing is performed and a second mode in which adaptive array processing is not performed, in accordance with a prescribed condition; and
  performing control in which, when said first mode is selected, first control is performed to operate said plurality of RF reception units and said adaptive array operational processing unit, and when said second mode is selected, second control is performed so that one RF reception unit is selected as a first RF reception unit to operate and an operation of an RF reception unit other than said first RF reception unit and said adaptive array operational processing unit is stopped.

10. The method of controlling adaptive array processing according to claim 9, further comprising the step of detecting a level of a reception signal received at a corresponding antenna, wherein
  in said step of selecting, said first mode is selected when a difference between a highest level and a lowest level among said detected reception signal levels is equal to or lower than a prescribed value, and
  said second mode is selected when the difference between the highest level and the lowest level is larger than said prescribed value.

11. The method of controlling adaptive array processing according to claim 9, further comprising the step of detecting a level of a reception signal received at a corresponding antenna, wherein
  in said step of selecting, said first mode is selected when all reception signal levels of said detected reception signal levels are lower than a prescribed value, and
  said second mode is selected when a level of at least one reception signal is equal to or higher than said prescribed value.

12. The method of controlling adaptive array processing according to claim 9, further comprising the steps of demodulating a signal processed by said adaptive array operational processing unit when said first mode is selected, and calculating communication quality based on said demodulated signal, wherein
  in said step of selecting, while said first mode is selected, said first mode is maintained when communication quality is not higher than prescribed quality, and said second mode is selected when said communication quality is higher than the prescribed quality.

13. The method of controlling adaptive array processing according to claim 9, further comprising the steps of demodulating a signal processed by said first RF reception unit and not processed by said adaptive array operational processing unit while said second mode is selected, and calculating communication quality based on said demodulated signal, wherein in said step of selecting, while said second mode is selected, said first mode is selected when communication quality is not higher than prescribed quality, and said second mode is maintained when said communication quality is higher than the prescribed quality.

14. The method of controlling adaptive array processing according to claim 9, further comprising the step of inputting selection from said first mode and said second mode by user manipulation, wherein in said step of selecting, said first mode is selected when selection of said first mode is input and said second mode is selected when selection of said second mode is input.

15. The method of controlling adaptive array processing according to claim 9, further comprising the step of detecting a level of a reception signal received at a corresponding antenna, wherein in said step of controlling, when said second mode is selected, an RF reception unit that has output a level highest among said detected reception signal levels is selected as a first RF reception unit.

16. The method of controlling adaptive array processing according to claim 9, wherein in said controlling step, a predetermined RF reception unit is selected as a first RF reception unit when said second mode is selected.

17. A program for controlling adaptive array processing in a radio reception apparatus which includes a plurality of antennas, RF reception units provided corresponding to each antenna and performing amplification and frequency conversion of signals received at each antenna, and an adaptive array operational processing unit performing adaptive array operational processing on signals output from the plurality of RF reception units, causing a computer to execute the steps of:

selecting from a first mode in which adaptive array processing is performed and a second mode in which adaptive array processing is not performed, in accordance with a prescribed condition; and performing control in which, when said first mode is selected, first control is performed to operate said plurality of RF reception units and said adaptive array operational processing unit, and when said second mode is selected, second control is performed so that one RF reception unit is selected as a first RF reception unit to operate and an operation of an RF reception unit other than said first RF reception unit and said adaptive array operational processing unit is stopped.

18. The program for controlling adaptive array processing according to claim 17, wherein said RF reception unit further detects a level of a reception signal received at a corresponding antenna, in said step of selecting, said first mode is selected when a difference between a highest level and a lowest level among said detected reception signal levels is equal to or lower than a prescribed value, and said second mode is selected when the difference between the highest level and the lowest level is larger than said prescribed value.

19. The program for controlling adaptive array processing according to claim 17, wherein said RF reception unit further detects a level of a reception signal received at a corresponding antenna, in said step of selecting, said first mode is selected when all reception signal levels of said detected reception signal levels are lower than a prescribed value, and said second mode is selected when a level of at least one reception signal is equal to or higher than said prescribed value.

20. The program for controlling adaptive array processing according to claim 17, further causes a computer to execute the steps of demodulating a signal processed by said adaptive array operational processing unit when said first mode is selected, and calculating communication quality based on said demodulated signal, wherein in said step of selecting, while said first mode is selected, said first mode is maintained when communication quality is not higher than prescribed quality, and said second mode is selected when said communication quality is higher than the prescribed quality.

* * * * *